US009219433B2

(12) United States Patent
Amano

(10) Patent No.: US 9,219,433 B2
(45) Date of Patent: Dec. 22, 2015

(54) VEHICLE AND METHOD OF CONTROLLING VEHICLE

(75) Inventor: Takashi Amano, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/355,102

(22) PCT Filed: Nov. 7, 2011

(86) PCT No.: PCT/JP2011/075592
§ 371 (c)(1),
(2), (4) Date: Apr. 29, 2014

(87) PCT Pub. No.: WO2013/069079
PCT Pub. Date: May 16, 2013

(65) Prior Publication Data
US 2014/0300302 A1 Oct. 9, 2014

(51) Int. Cl.
H02P 1/04 (2006.01)
H02P 6/00 (2006.01)
B60K 6/445 (2007.10)
B60L 15/20 (2006.01)
(Continued)

(52) U.S. Cl.
CPC ............... *H02P 6/002* (2013.01); *B60K 6/445* (2013.01); *B60L 15/20* (2013.01); *B60L 15/2045* (2013.01); *B60W 10/08* (2013.01); *B60W 20/00* (2013.01); *B60L 2240/12* (2013.01); *B60L 2260/24* (2013.01); *B60L 2260/26* (2013.01); *B60W 2710/083* (2013.01); *Y02T 10/6239* (2013.01); *Y02T 10/7275* (2013.01)

(58) Field of Classification Search
CPC .................. F16H 2200/201; F16H 2200/2041;
F16H 3/728; F16H 2057/0012; F16H 59/40;
F16H 59/46; F16H 59/70; F16H 61/061;
F16H 61/66; F16H 63/502; G06F 1/3203;
G06F 11/0739; G06F 11/0757; G06F 1/26
USPC ................. 318/139, 400.09, 494, 716; 477/5;
701/20, 22
See application file for complete search history.

(56) References Cited

U.S. PATENT DOCUMENTS 4,047,083 A * 9/1977 Plunkett .......................... 318/807
5,658,217 A * 8/1997 Tsukada ......................... 477/109

(Continued)

FOREIGN PATENT DOCUMENTS

EP 2762349 A1 8/2014
JP A-08-163702 6/1996

(Continued)

*Primary Examiner* — Paul Ip
(74) *Attorney, Agent, or Firm* — Oliff PLC

(57) ABSTRACT

A vehicle includes a motor generator generating driving power for running, and an ECU. The ECU performs driving power variation operation on the motor generator in which the motor generator is switched between a first state (acceleration running) and a second state (inertial running) when power requested by a user varies within a prescribed range to run the vehicle. In the first state, the motor generator generates driving power. In the second state, the motor generator generates driving power smaller than the driving power in the first state. The ECU controls the motor generator in such a manner that the driving power during the acceleration running has a non-rectangular shape. As a result, gradual variation in driving power can be provided at the time of switching between the acceleration running and the inertial running, to improve drivability.

14 Claims, 10 Drawing Sheets

(51) Int. Cl.
*B60W 10/08* (2006.01)
*B60W 20/00* (2006.01)

(56) References Cited

U.S. PATENT DOCUMENTS

| | | | | |
|---|---|---|---|---|
| 5,757,161 | A * | 5/1998 | Ikkai et al. | 318/719 |
| 5,886,419 | A * | 3/1999 | Saito et al. | 307/10.1 |
| 6,182,807 | B1 * | 2/2001 | Saito et al. | 191/2 |
| 6,401,891 | B1 * | 6/2002 | Saito et al. | 191/2 |
| 6,408,998 | B1 * | 6/2002 | Saito et al. | 191/2 |
| 6,479,973 | B2 * | 11/2002 | Saito et al. | 323/282 |
| 6,604,026 | B2 * | 8/2003 | Schmitt | 701/1 |
| 6,736,757 | B2 * | 5/2004 | Kubo et al. | 477/144 |
| 6,769,521 | B2 * | 8/2004 | Saito et al. | 191/2 |
| 7,028,819 | B2 * | 4/2006 | Saito et al. | 191/2 |
| 7,605,561 | B2 * | 10/2009 | Yamazaki et al. | 320/104 |
| 7,702,445 | B2 * | 4/2010 | Gianoglio et al. | 701/67 |
| 7,933,694 | B2 * | 4/2011 | Kato | 701/22 |
| 8,099,204 | B2 * | 1/2012 | Snyder et al. | 701/22 |
| 8,281,167 | B2 * | 10/2012 | Nakamura et al. | 713/320 |
| 8,668,621 | B2 * | 3/2014 | Yoshida et al. | 477/5 |
| 8,896,252 | B2 * | 11/2014 | Yamada et al. | 318/494 |
| 8,989,936 | B2 * | 3/2015 | Takamura et al. | 701/22 |
| 9,002,548 | B2 * | 4/2015 | Hrdlicka et al. | 701/20 |
| 2001/0016918 | A1 * | 8/2001 | Alexander et al. | 713/323 |
| 2002/0043964 | A1 * | 4/2002 | Saito et al. | 323/282 |
| 2002/0078390 | A1 * | 6/2002 | Sumida | 713/320 |
| 2003/0004614 | A1 * | 1/2003 | Schmitt | 701/1 |
| 2006/0102398 | A1 | 5/2006 | Mizuno | |
| 2006/0287794 | A1 * | 12/2006 | Gianoglio et al. | 701/53 |
| 2009/0118964 | A1 * | 5/2009 | Snyder et al. | 701/99 |
| 2009/0120699 | A1 * | 5/2009 | Suzuki et al. | 180/65.265 |
| 2009/0146615 | A1 * | 6/2009 | Zillmer et al. | 322/23 |
| 2009/0179627 | A1 * | 7/2009 | Innami et al. | 323/318 |
| 2010/0100264 | A1 * | 4/2010 | Kato | 701/22 |
| 2011/0178678 | A1 * | 7/2011 | Asahara | 701/36 |
| 2011/0241598 | A1 * | 10/2011 | Yamada et al. | 318/716 |
| 2012/0226403 | A1 * | 9/2012 | Yamamoto et al. | 701/22 |
| 2012/0271498 | A1 * | 10/2012 | Kobayashi | 701/22 |
| 2013/0012353 | A1 * | 1/2013 | Yoshida et al. | 477/5 |

FOREIGN PATENT DOCUMENTS

| | | |
|---|---|---|
| JP | A-08-172791 | 7/1996 |
| JP | A-2004-127747 | 4/2001 |
| JP | A-2008-520485 | 6/2008 |
| JP | A-2010-006309 | 1/2010 |
| JP | 2010-093947 A | 4/2010 |
| JP | A-2011-011648 | 1/2011 |
| JP | A-2011-067043 | 3/2011 |

* cited by examiner

VEHICLE AND METHOD OF CONTROLLING VEHICLE

TECHNICAL FIELD

The present invention relates to vehicles and methods of controlling the vehicles, and more particularly to running control of a vehicle running with inertial force of the vehicle.

BACKGROUND ART

In recent years, vehicles incorporating a power storage device (such as a secondary battery or capacitor) and running with driving power generated from electric power stored in the power storage device have been receiving attention as environmentally friendly vehicles. Examples of such vehicles include an electric vehicle, a hybrid vehicle, and a fuel cell vehicle.

There is a need to improve energy efficiency of these vehicles by increasing gasoline mileage and electric mileage, so as to further reduce environmental loads.

Japanese National Patent Publication No. 2008-520485 (PTD 1) discloses a hybrid vehicle including an internal combustion engine and a motor generator, in which the motor generator is controlled, when in a generator mode, in such a manner that the motor generator alternates between a first interval and a second interval. During the first interval, the motor generator is driven to operate with a high output which is greater than an actual power consumption of a vehicle electrical system. During the second interval, the motor generator is switched off.

According to Japanese National Patent Publication No. 2008-520485 (PTD 1), when the motor generator operates as a generator, the motor generator is driven at an operating point of high efficiency in the first interval and the motor generator is stopped in the second interval. As a result, continuation of the operation of the motor generator with low efficiency during operation of electric power generation can be suppressed, thus improving energy efficiency of the vehicle during the operation of electric power generation.

Japanese Patent Laying-Open No. 2010-6309 (PTD 2) discloses a hybrid vehicle including an internal combustion engine and a motor generator, which is configured to alternate between running with driving power generated by the internal combustion engine and running in a coasting state in which the internal combustion engine is stopped. As a result, the internal combustion engine can be driven at an operating point of high efficiency, thus increasing gasoline mileage.

CITATION LIST

Patent Documents

PTD 1: Japanese National Patent Publication No. 2008-520485
PTD 2: Japanese Patent Laying-Open No. 2010-6309
PTD 3: Japanese Patent Laying-Open No. 8-172791
PTD 4: Japanese Patent Laying-Open No. 8-163702

SUMMARY OF INVENTION

Technical Problem

In the configuration of Japanese National Patent Publication No. 2008-520485 (PTD 1) described above, however, driving and stopping of the motor generator is repeated when the motor generator generates electric power, and the driving power for running the vehicle is not varied.

In the configuration disclosed in Japanese Patent Laying-Open No. 2010-6309 (PTD 2), acceleration coasting running control is performed by repeating driving and stopping of an engine which is the internal combustion engine in the hybrid vehicle, and the operation of the motor generator is not considered.

The present invention has been made in order to solve such problems, and an object of the present invention is to enhance energy efficiency and improve drivability during running of a vehicle capable of running by using inertial force of the vehicle with varying driving power from at least a motor generator.

Solution Problem

A vehicle according to the present invention includes a rotating electric machine generating driving power for running the vehicle, and a control device for controlling the rotating electric machine. The control device performs driving power variation operation on the rotating electric machine in which the rotating electric machine is switched between a first state and a second state to run the vehicle, the rotating electric machine generating driving power in the first state, the rotating electric machine generating driving power smaller than the driving power in the first state in the second state. The control device controls the rotating electric machine in such a manner that the driving power in the first state has a non-rectangular shape.

Preferably, the control device gradually varies the driving power output from the rotating electric machine during at least one of a transition of the driving power from the first state to the second state and a transition of the driving power from the second state to the first state.

Preferably, the control device causes magnitude of temporal variation in the driving power during the transition of the driving power from the first state to the second state and magnitude of temporal variation in the driving power during the transition of the driving power from the second state to the first state to have different values.

Preferably, the control device varies the driving power in the first state over time.

Preferably, the control device performs the driving power variation operation when driving power requested by a user varies within a prescribed range.

Preferably, the control device causes switching between the first and second states so as to maintain a speed of the vehicle within an acceptable range while the driving power variation operation is performed.

Preferably, the control device starts a transition to the first state in response to a decrease in the speed of the vehicle to a first threshold value determined from a lower limit value of the acceptable range, and starts a transition to the second state in response to an increase in the speed of the vehicle to a second threshold value determined from an upper limit value of the acceptable range.

Preferably, the driving power in the first state is set to be larger than reference driving power of constant output capable of maintaining a speed of the vehicle. The driving power in the second state is set to be smaller than the reference driving power.

Preferably, the control device stops the generation of the driving power from the rotating electric machine in the second state.

Preferably, the vehicle runs mainly with inertial force of the vehicle in the second state.

Preferably, the vehicle further includes an other driving source generating driving power for running.

Preferably, the control device sets a sum of the driving power of the rotating electric machine and the other driving source in the first state to be larger than reference driving power of constant output capable of maintaining a speed of the vehicle. The control device sets a sum of the driving power of the rotating electric machine and the other driving source in the second state to be smaller than the reference driving power.

Preferably, the control device performs driving power variation operation on the other driving source in which the other driving source is switched between a third state and a fourth state, the other driving source generating driving power in the third state, the other driving source generating driving power smaller than the driving power in the third state in the fourth state.

Preferably, the other driving source is an internal combustion engine.

Preferably, the other driving source is an other rotating electric machine different from the rotating electric machine.

A method of controlling a vehicle according to the present invention is a method of controlling a vehicle including a rotating electric machine generating driving power for running. The control method includes the steps of putting the rotating electric machine in a first state where the rotating electric machine generates driving power, putting the rotating electric machine in a second state where the rotating electric machine generates driving power smaller than the driving power in the first state, performing driving power variation operation of switching between the first and second states to run the vehicle, and controlling the rotating electric machine in such a manner that the driving power in the first state has a non-rectangular shape.

Advantageous Effects of Invention

According to the present invention, energy efficiency can be enhanced and drivability can be improved during running of a vehicle capable of running by using inertial force of the vehicle with varying driving power from at least a motor generator.

DESCRIPTION OF EMBODIMENTS

Figure 1:
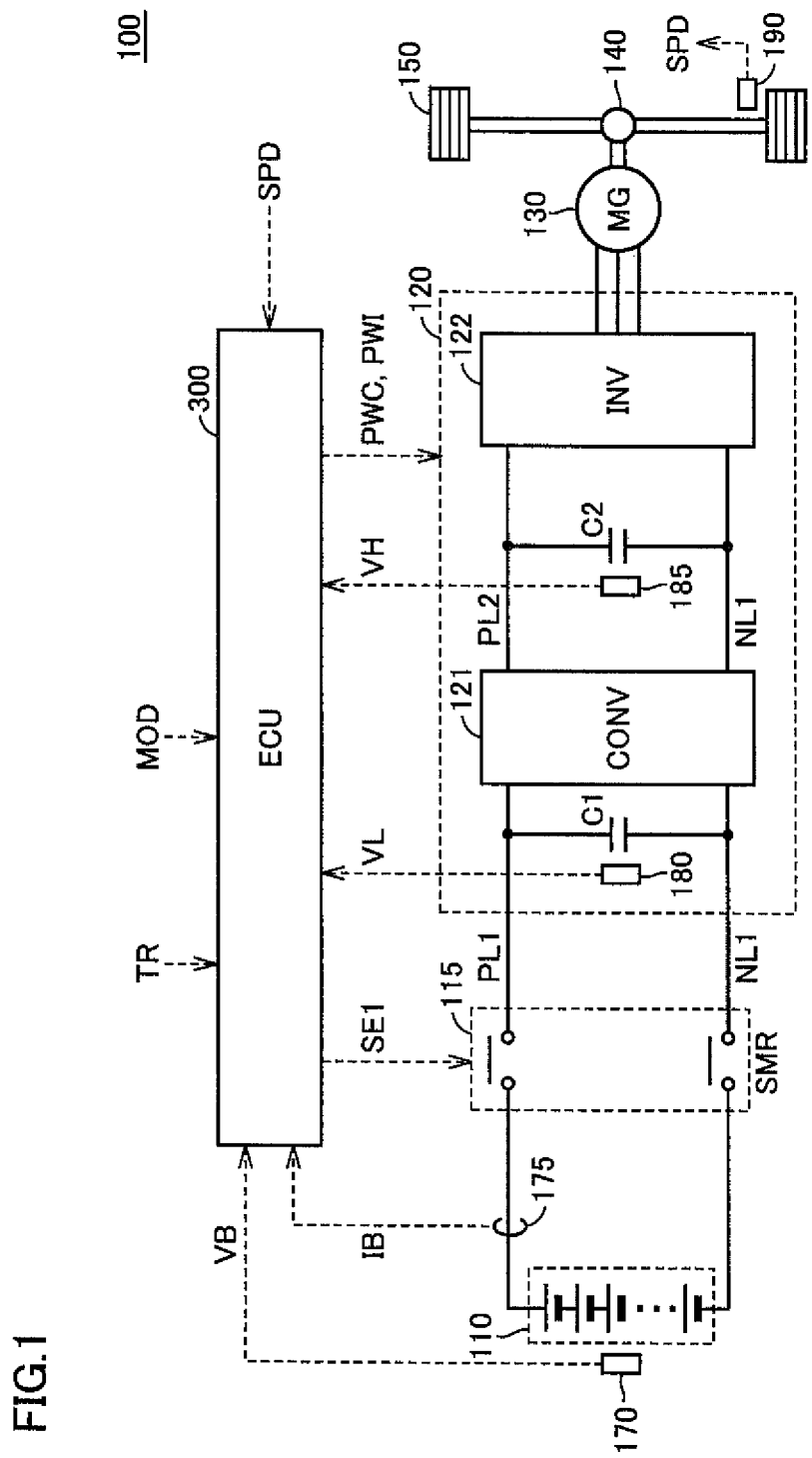
FIG. 1 is an overall block diagram of a vehicle according to a first embodiment.

Embodiments of the present invention will be hereinafter described in detail with reference to the drawings, in which the same or corresponding parts are designated by the same reference characters, and the description thereof will not be repeated.

First Embodiment

FIG. 1 is an overall block diagram of a vehicle 100 according to a first embodiment of the present invention. As will be described below in detail, vehicle 100 is an electric vehicle or a fuel cell vehicle using a rotating electric machine as a driving source.

Referring to FIG. 1, vehicle 100 includes a power storage device 110, a system main relay (SMR) 115, a PCU (Power Control Unit) 120 which is a driving device, a motor generator 130, a power transmission gear 140, a drive wheel 150, and an ECU (Electronic Control Unit) 300 which is a control device. PCU 120 includes a converter 121, an inverter 122, voltage sensors 180, 185, and capacitors C1, C2.

Power storage device 110 is an electric power storage component configured in a chargeable/dischargeable manner. Power storage device 110 includes a secondary battery such as a lithium-ion battery, a nickel-metal hydride battery or a lead-acid battery, or a power storage element such as an electric double layer capacitor.

Power storage device 110 is connected to PCU 120 through power lines PL1 and NL1. Power storage device 110 supplies PCU 120 with electric power for generating driving power for vehicle 100. Power storage device 110 stores electric power generated by motor generator 130. An output of power storage device 100 is, for example, about 200V.

Power storage device 110 is provided with a voltage sensor 170 and a current sensor 175. Voltage sensor 170 detects a voltage VB of power storage device 110, and outputs a result of the detection to ECU 300. Current sensor 175 detects a current IB input to and output from the power storage device, and outputs the detection value to ECU 300.

SMR 115 includes a relay having one end connected to a positive electrode terminal of power storage device 110 and the other end connected to power line PL1 that is connected to PCU 120, and another relay having one end connected to a negative electrode terminal of power storage device 110 and the other end connected to power line NL1 that is connected to PCU 120. In response to a control signal SE1 from ECU 300, SMR 115 switches between supply and interruption of electric power between power storage device 110 and PCU 120.

In response to a control signal PWC from ECU 300, converter 121 converts a voltage between power lines PL1, NL1 and power lines PL2, NL1.

Inverter 122 is connected to power lines PL2 and NL1. In response to a control signal PWI from ECU 300, inverter 122 converts DC power supplied from converter 121 to AC power, to drive motor generator 130.

Capacitor C1 is provided between power lines PL1 and NL1, and reduces voltage variation between power lines PL1 and NL1. Capacitor C2 is provided between power lines PL2 and NL1, and reduces voltage variation between power lines PL2 and NL1.

Voltage sensors 180 and 185 detect voltages VL and VH across capacitors C1 and C2, respectively, and output the detection values to ECU 300.

Motor generator 130 is an AC rotating electric machine, for example, a permanent magnet synchronous motor including a rotor in which a permanent magnet is embedded.

An output torque of motor generator 130 is transmitted to drive wheel 150 through power transmission gear 140 including a reduction gear and a power split device, to run vehicle 100. During regenerative braking operation of vehicle 100, motor generator 130 can generate electric power by rotation of drive wheel 150. The electric power thus generated is then converted by PCU 120 to charging power for power storage device 110.

A speed sensor 190 is provided in the vicinity of drive wheel 150 so as to detect the speed of vehicle 100 (vehicle speed). Speed sensor 190 detects a vehicle speed SPD based on a rotational speed of drive wheel 150, and outputs the detection value to ECU 300. As a speed sensor, a rotation angle sensor (not shown) for detecting a rotation angle of motor generator 130 may be used. In this case, ECU 300 indirectly computes vehicle speed SPD based on temporal variation in rotation angle of motor generator 130, a reduction ratio and the like.

Although not shown in FIG. 1, ECU 300 includes a CPU (Central Processing Unit), a storage device and an input/output buffer, causes input of signals from various sensors and the like and output of control signals to various devices, and controls power storage device 110 and the various devices of vehicle 100. Such control is not limited to software processing, but may be processed by dedicated hardware (electronic circuitry).

ECU 300 generates and outputs control signals for controlling PCU 120, SMR 115 and the like. Although FIG. 1 shows a configuration where one control device is provided as ECU 300, a separate control device may be provided for each function or for each device to be controlled, such as a control device for PCU 120 and a control device for power storage device 110.

ECU 300 computes an SOC (State of Charge) of power storage device 110 based on the detection values of voltage VB and current IB from voltage sensor 170 and current sensor 175 provided on power storage device 110.

ECU 300 receives a request torque TR, which is determined based on operation of an accelerator pedal (not shown) by a user, from an upper ECU (not shown). ECU 300 generates controls signals PWC and PWI for converter 121 and inverter 122 based on request torque TR from the user, respectively, to drive motor generator 130.

ECU 300 also receives a mode signal MOD which is set by the user. This mode signal MOD is a signal for indicating whether or not inertial running control which will be described later should be performed. Mode signal MOD is switched by a specific switch, setting on an operation screen or the like. Alternatively, mode signal MOD may be automatically set when specific conditions are satisfied.

For example, ECU 300 operates such that the inertial running control is performed when mode signal MOD is set to ON, and operates such that the inertial running control is not performed but normal running is performed when mode signal MOD is set to OFF.

In such a vehicle, the electric power in the power storage device is consumed when driving power is generated by motor generator 130. Since power storage device 110 has a predetermined capacity, there is a need to improve energy efficiency during running to suppress power consumption in order for the vehicle to run the longest distance possible with the electric power stored in the power storage device.

Inertial force acts on a vehicle during vehicle running. Thus, if driving power generated by a motor generator is made lower during running than driving power required to maintain the vehicle speed, running with the inertial force of the vehicle (hereinafter also referred to as "inertial running") is continued for some time while the vehicle speed gradually decreases.

During this inertial running, the motor generator outputs small driving power, thus reducing power consumption by the power storage device. Accordingly, if the vehicle can run utilizing the inertial running, energy efficiency during the vehicle running can be improved.

In the first embodiment, therefore, when the request torque from the user is substantially constant and the vehicle is running at a vehicle speed thereby maintained substantially constant in the vehicle shown in FIG. 1, the inertial running control is performed in which operation of repeating acceleration running with the driving power from the motor generator being in a high output state and inertial running with the driving power from the motor generator being in a low output state (which includes a case where the driving power is zero) (hereinafter also referred to as "driving power variation operation") is performed to run the vehicle, thereby improving energy efficiency during running.

When switching the driving power from the motor generator in this manner, if the driving power is varied in a rectangular pulse shape between the high output state and low output state, acceleration and deceleration change suddenly at the rise and fall of a pulse, which may result in an increased torque shock given to the user.

In the first embodiment, therefore, when switching the driving power while the driving power variation operation is performed, the magnitude of a rate of temporal variation in the driving power at the rise and fall of a pulse of the driving power is made gradual to relieve the torque shock at the time of switching, thereby improving drivability.

Figure 2:
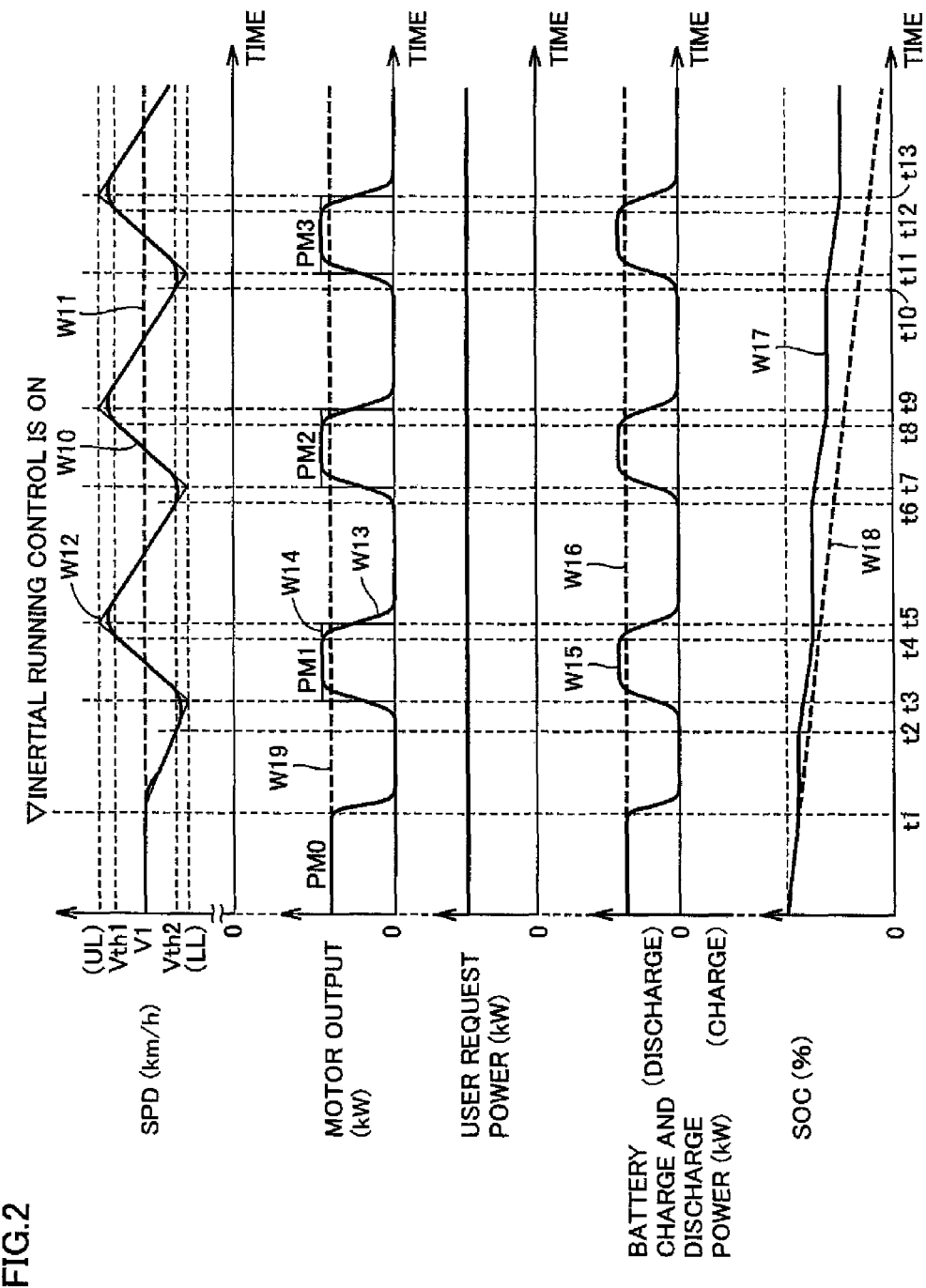
FIG. 2 is a time chart illustrating the outline of inertial running control in the first embodiment.

FIG. 2 is a time chart illustrating the outline of inertial running control in the first embodiment. In FIG. 2, a horizontal axis represents time, and a vertical axis represents vehicle speed SPD, the output of the motor generator, the request power from the user, charge and discharge power of the power storage device (battery), and the SOC of the power storage device. Regarding the charge and discharge power of the power storage device, the discharge power is represented as positive value and the charge power is represented as negative value.

Referring to FIGS. 1 and 2, it is assumed that vehicle 100 runs on a flat road at a constant vehicle speed V1. In this case, power requested by the user is given as a substantially constant value, as shown in FIG. 2. That "power requested by the user is a substantially constant value" refers to a state in which the user request power is maintained, although it varies to a degree, within a predetermined range (e.g., ±3%) during a prescribed period of time.

When the inertial running control in the first embodiment is not applied, an output of substantially constant magnitude is continuously provided from motor generator 130, as indicated by a broken line W19 in FIG. 2. As such, vehicle speed SPD is maintained substantially constant.

At this time, power storage device 110 continuously outputs constant electric power as indicated by a broken line W16 in FIG. 2, causing the SOC of power storage device 110 to linearly decrease as indicated by a broken line W18 in FIG. 2.

In contrast, when the inertial running control in the first embodiment is applied, basically, acceleration running and inertial running are alternately repeated. In the acceleration running, the vehicle runs with prescribed driving power from motor generator 130. In the inertial running, the vehicle runs with driving power smaller than that during the acceleration running. The inertial running includes a case where the driving power from motor generator 130 is zero, namely, where motor generator 130 is stopped. FIG. 2 illustrates an example where motor generator 130 is stopped during inertial running on a flat road.

Specifically, until time t1, the inertial running control in the first embodiment is not applied, and a motor output PM0 is continuously provided.

When the user indicates that the inertial running control should be performed at time t1, motor generator 130 is stopped first. As a result, the driving power from motor generator 130 is stopped, so that running with the inertial force is started and vehicle speed SPD gradually decreases, as indicated by a solid line W10 in FIG. 2.

At this time, the charge and discharge power of power storage device 110 becomes zero, thus suppressing a decrease in SOC. The output of motor generator 130 is gradually varied from PM0 to zero, as indicated by a solid line W13 in FIG. 2.

Then, when vehicle speed SPD decreases to a threshold value Vth2 (>LL) which is determined from a lower limit value LL of a predetermined acceptable range with respect to target vehicle speed V1 (time t2 in FIG. 2), driving of motor generator 130 is resumed and the driving power is gradually increased over time until it reaches PM1 (>PM0). Vehicle 100 is thus accelerated. In this high output state where the driving power is PM1 larger than PM0, a decrease in SOC is larger than when the driving power variation operation is not performed. Nevertheless, because power is not consumed by the inertial running between times t1 and t2, the total SOC is maintained at a high level (solid line W17 in FIG. 2).

Then, when vehicle speed SPD increases to a threshold value Vth1 (<UL) which is determined from an upper limit value UL of the above predetermined acceptable range with respect to vehicle speed V1 (time t4 in FIG. 2), the driving power of motor generator 130 is gradually reduced until it becomes zero. Inertial running is thus performed again.

Then, in a similar manner, motor generator 130 is driven and the driving power is gradually increased to PM1 when vehicle speed SPD decreases to threshold value Vth2, and the driving power of motor generator 130 is gradually reduced to the low output state when vehicle speed SPD increases to threshold value Vth1.

By varying the driving power in this manner, gradual variation in driving power can be provided at the time of switching of the driving power from the low output state to the high output state and from the high output state to the low output state, as compared to an example where the output of motor generator 130 is varied in a rectangular pulse shape at times when vehicle speed SPD should be upper limit value UL and lower limit value LL (e.g., times t3, t5, t7 and t9 in FIG. 2) as indicated by a solid line W14 in FIG. 2. As such, vehicle speed SPD varies gradually between acceleration running and inertial running as indicated by solid line W10 in FIG. 2, thereby preventing the occurrence of great torque shock. The drivability can be thus improved.

Figure 3:
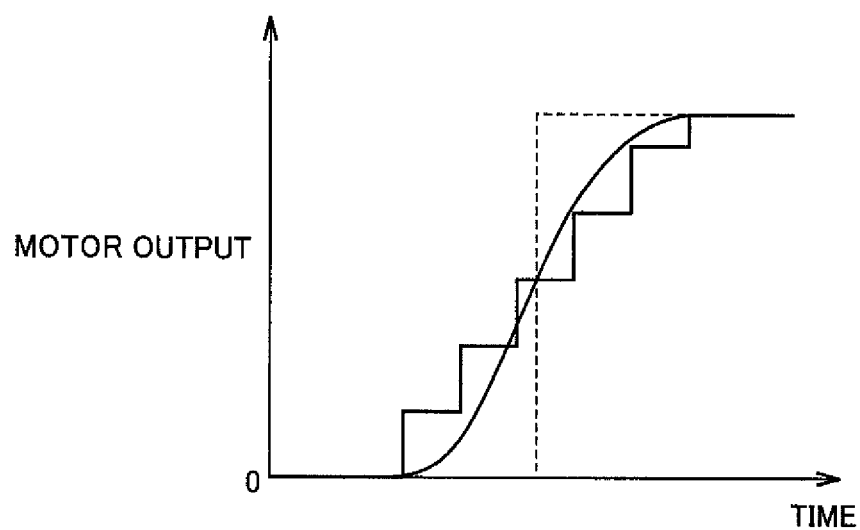
FIG. 3 illustrates an exemplary variation in driving power of a motor generator during a transition from inertial running to acceleration running.

The driving power during a transition period between the low output state and the high output state may be continually increased (or reduced), or may be varied in steps, as shown in FIG. 3.

Figure 4:
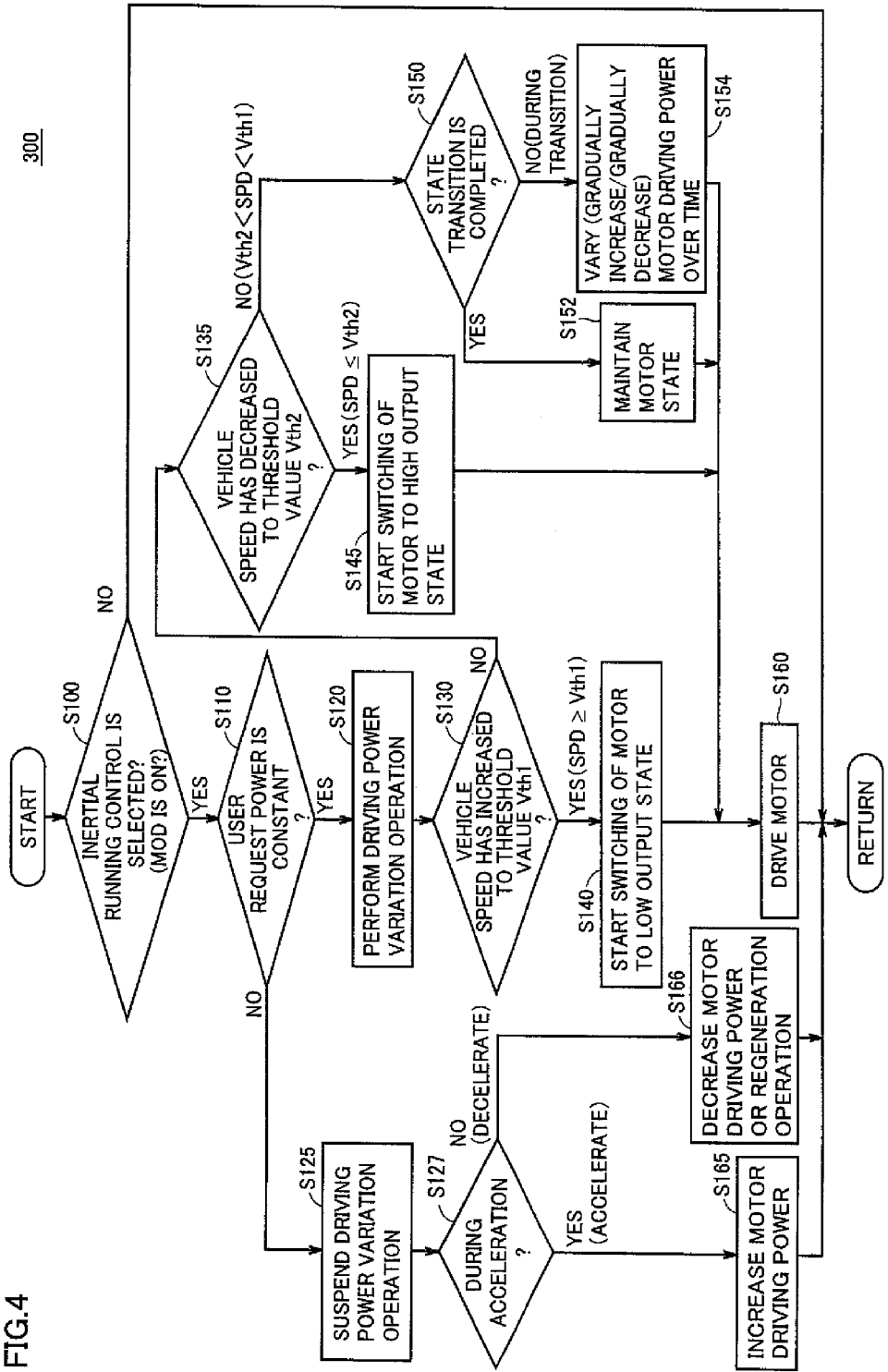
FIG. 4 is a flow chart illustrating a process of the inertial running control performed by an ECU in the first embodiment.

FIG. 4 is a flow chart illustrating a process of the inertial running control performed by ECU 300 in the first embodiment. The steps in the flow charts shown in FIG. 3 and FIG. 6 described later are implemented by executing a program stored in advance in ECU 300 at regular intervals. Alternatively, processing of some of the steps may be implemented by building dedicated hardware (electronic circuitry).

Referring to FIGS. 1 and 4, in step (the step is hereinafter abbreviated as S) 100, ECU 300 determines whether or not the inertial running control has been selected based on mode signal MOD which is set by the user.

If mode signal MOD has been set to OFF and the inertial running control has not been selected (NO in S100), the subsequent processing is skipped and ECU 300 returns the process to a main routine.

If mode signal MOD has been set to ON and the inertial running control has been selected (YES in S100), the process proceeds to S110 where ECU 300 determines whether or not the user request power is substantially constant based on request torque TR.

If the user request power is substantially constant (YES in S110), the process proceeds to S120 where ECU 300 makes a selection such that the driving power variation operation is performed. Although not shown in FIG. 3, immediately after the start of the driving power variation operation, motor generator 130 is initially stopped and inertial running is performed, as shown in FIG. 2.

Then, in S130, ECU 300 determines whether or not vehicle speed SPD has increased to threshold value Vth1 which is determined from upper limit value UL of the acceptable speed range.

As described above, immediately after the start of the driving power variation operation, the driving power of motor generator 130 is initially reduced and inertial running is performed. Thus, vehicle speed SPD is lower than threshold value Vth1, and gradually decreases.

That is, since vehicle speed SPD has not increased to threshold value Vth1 of the acceptable speed range (NO in S130), the process proceeds to S135 where ECU 300 determines whether or not vehicle speed SPD has decreased to threshold value Vth2 which is determined from lower limit value LL of the acceptable speed range.

When vehicle speed SPD is decreasing within the acceptable speed range (Vth2<SPD<Vth1), namely, if vehicle speed SPD has not decreased to threshold value Vth2 of the acceptable speed range (NO in S135), the process proceeds to S150 where ECU 300 determines whether or not a transition to the low output state has been completed.

If a transition to the low output state has not been completed (NO in S150) and is underway, the process proceeds to S154 where ECU 300 reduces the driving power of motor generator 130 over time, and drives motor generator 130 with the driving power and performs inertial running (S160).

If a transition to the low output state has been completed (YES in S150), on the other hand, the process proceeds to S152 where ECU 300 maintains the current state of motor generator 130, and drives motor generator 130 with the driving power and performs inertial running (S160).

The process then returns to the main routine, and the process is performed again from S100 in the next control cycle.

When vehicle speed SPD decreases to threshold value Vth2 while the inertial running is continued (SPD≤Vth2) (YES in S135), the process proceeds to S145 where ECU 300 starts switching of motor generator 130 to the high output state and increases the driving power of motor generator 130 over time. Then, in S160, ECU 300 drives motor generator 130 with the driving power and performs acceleration running.

While the vehicle speed is increasing within the acceptable speed range by this acceleration running, NO is selected in S130 and S135, and the process proceeds to S150. Then, if a transition to the high output state has not been completed (NO in S150), ECU 300 increases the driving power of motor generator 130 over time (S154) and performs acceleration running (S160). If a transition to the high output state has been completed (YES in S150), ECU 300 maintains motor generator 130 in the high output state (S152) and continues the acceleration running (S160).

Then, when vehicle speed SPD increases to threshold value Vth1 (YES in S130), ECU 300 causes switching from the acceleration running to the inertial running and the process proceeds to S140. In S140, ECU 300 starts switching of motor generator 130 to the low output state, and reduces the driving power of motor generator 130 over time. Then, in S160, ECU 300 drives motor generator 130 with the driving power and performs inertial running.

While the user request power is maintained substantially constant, the driving power variation operation as described above is performed so as to maintain vehicle speed SPD within the acceptable speed range.

When the user request power varies for the purpose of acceleration or deceleration (NO in S110), on the other hand, the process proceeds to S125 where ECU 300 suspends the driving power variation operation.

Then, if acceleration is indicated by the user request power (YES in S127), ECU 300 increases the driving power of motor generator 130 and accelerates vehicle 100 (S165).

If deceleration is indicated by the user (NO in S127), on the other hand, the process proceeds to S166 where ECU 300 decelerates the vehicle by reducing the driving power of motor generator 130. If the vehicle needs to be decelerated more quickly, ECU 300 decelerates the vehicle by involving regenerative braking in which motor generator 130 is driven in a regenerative state. Alternatively, ECU 300 may decelerate the vehicle by switching between the deceleration by inertial running and the deceleration involving regenerative braking.

Then, when the acceleration or deceleration operation by the user ends and the user request power becomes substantially constant (YES in S110), the driving power variation operation is resumed.

By performing the control in accordance with the process as described above, when the user request power is substantially constant, the driving power variation operation of repeating inertial running and acceleration running can be performed. By gradually varying the driving power of the motor generator in a non-rectangular shape at the time of switching between the inertial running and the acceleration running, gradual variation in vehicle speed can be provided. As a result, the energy efficiency can be enhanced and the drivability can be improved during the vehicle running.

Although the magnitude of the rate of variation (rate of increase) in driving power during the transition from inertial running to acceleration running and the magnitude of the rate of variation (rate of decrease) in driving power during the transition from acceleration running to inertial running are shown to be substantially equal to each other in FIG. 2 described above, the magnitudes of the rates of variation when increasing and reducing the driving power may have different values.

Second Embodiment

In the configuration described in the first embodiment, gradual variation in driving power is provided at the time of switching of the driving power as an example of the driving power from the motor generator in a non-rectangular shape.

In a configuration described in a second embodiment, the driving power of the motor generator in the high output state is not kept constant, but is variably set such that the driving power increases and decreases in different patterns depending on the road surface condition and the like.

Figure 5:
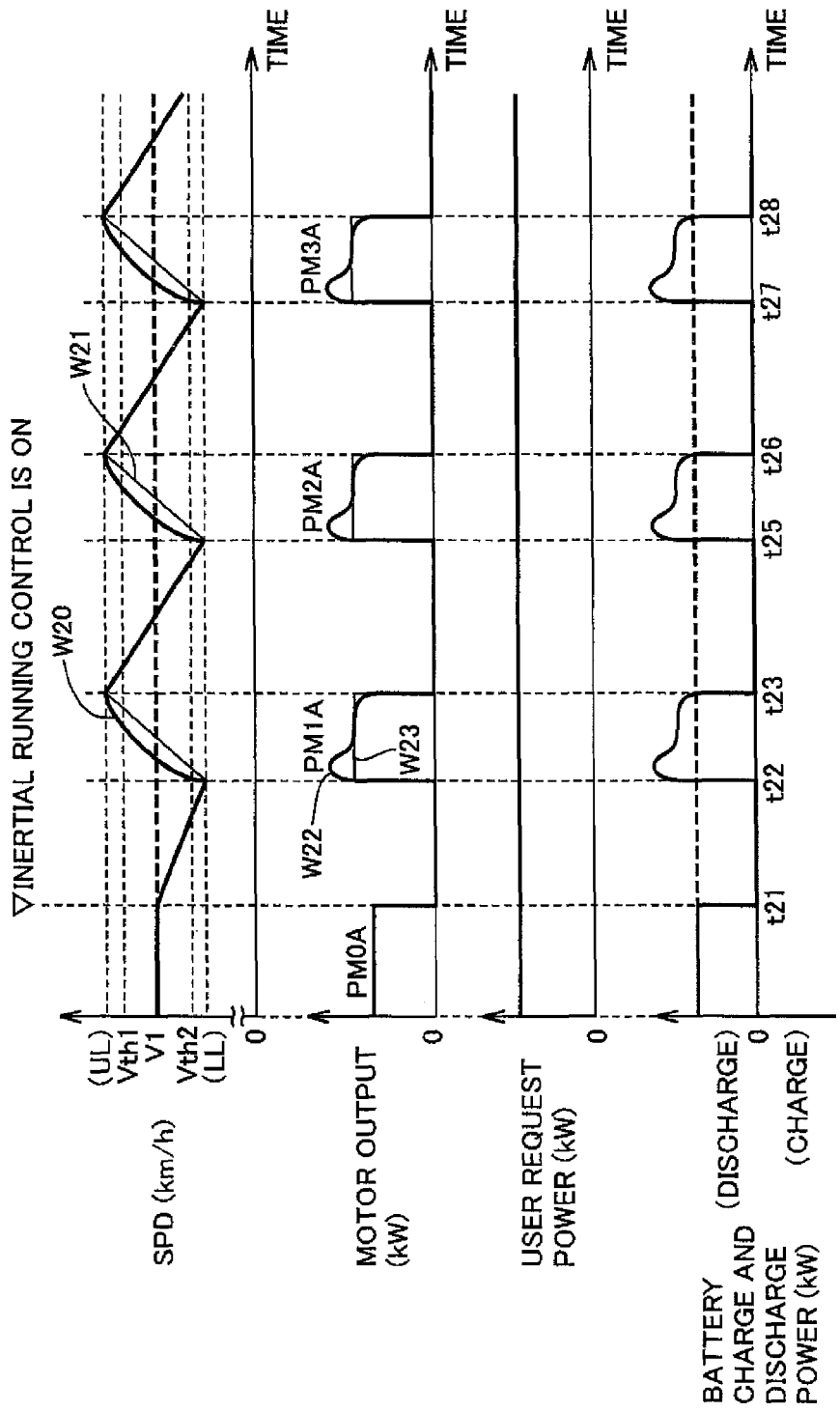
FIG. 5 is a time chart illustrating the outline of inertial running control in a second embodiment.

FIG. 5 is a time chart illustrating the outline of inertial running control in the second embodiment.

In FIG. 5, the switching between acceleration running and inertial running in the driving power variation operation takes place when vehicle speed SPD reaches lower limit value LL and upper limit value UL. Then, the driving power in the high output state is set to vary over time in accordance with a prescribed pattern as indicated by a solid line W22 in FIG. 5.

By changing this pattern depending on the road surface condition or by setting this pattern to suit the preferences of the user, the drivability can be improved.

Figure 6:
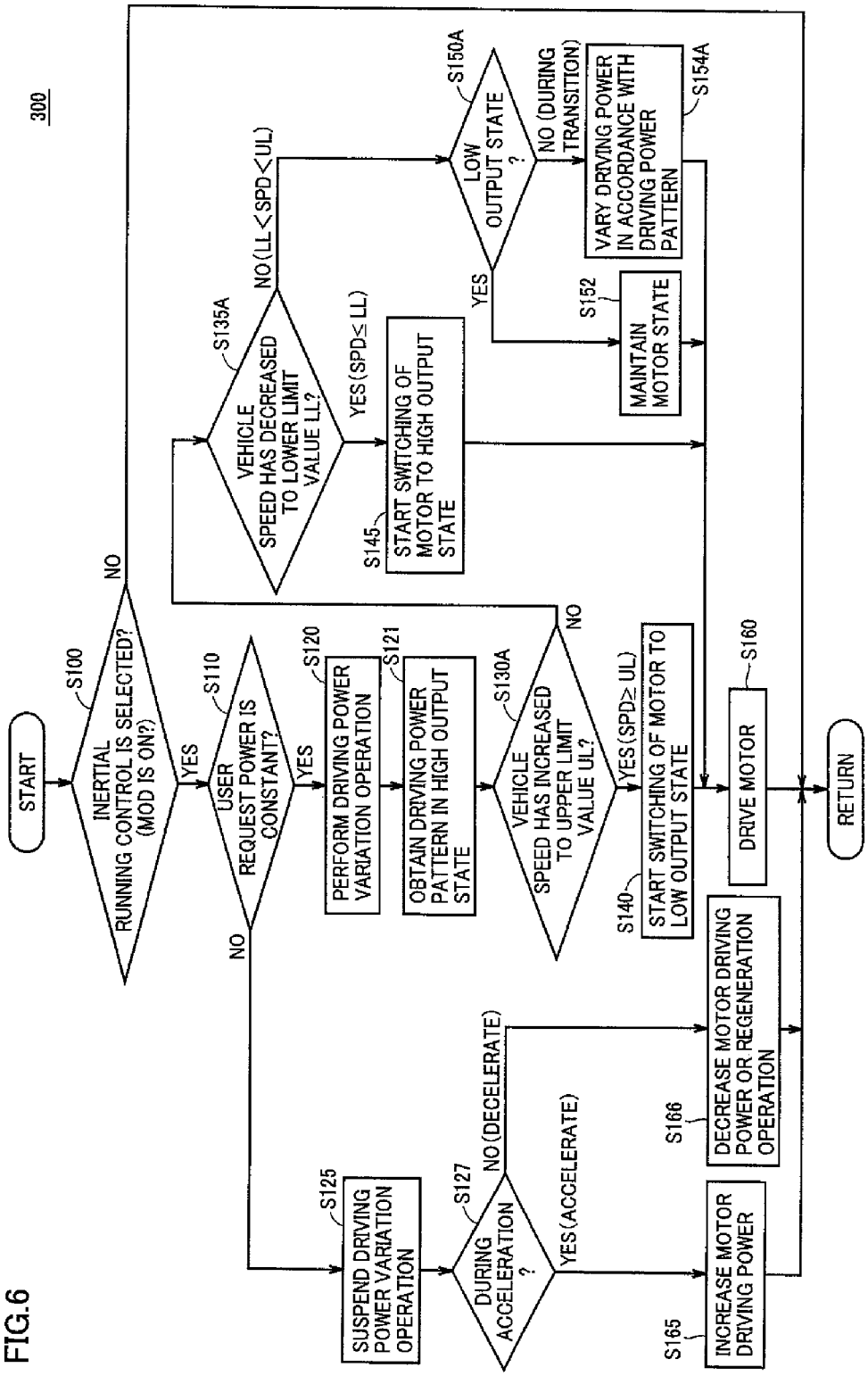
FIG. 6 is a flow chart illustrating a process of the inertial running control performed by the ECU in the second embodiment.

FIG. 6 is a flow chart illustrating a process of the inertial running control performed by ECU 300 in the second embodiment. In FIG. 6, steps S130, 135, 150 and 154 in the flow chart of FIG. 4 in the first embodiment are replaced by S130A, 135A, 150A and 154A, respectively, and S121 is added. The descriptions of the steps in FIG. 6 the same as those in FIG. 4 will not be repeated.

Referring to FIGS. 1 and 6, if the inertial running control is selected by the user (YES in S100) and if it is determined that the user request power is substantially constant (YES in S110), ECU 300 starts performing the driving power variation operation in S120.

Then, in S121, ECU 300 obtains a prestored driving power pattern in the high output state based on the road surface condition and the user's setting.

Then, in S130A, ECU 300 determines whether or not vehicle speed SPD has increased to upper limit value UL of the acceptable speed range.

Since vehicle speed SPD has not increased to upper limit value UL of the acceptable speed range while inertial running is performed (NO in S130A), the process proceeds to S135A where ECU 300 determines whether or not vehicle speed SPD has decreased to lower limit value LL of the acceptable speed range.

When vehicle speed SPD is decreasing within the acceptable speed range (LL<SPD<UL), namely, if vehicle speed SPD has not decreased to lower limit value LL of the acceptable speed range (NO in S135A), the process proceeds to S150A where ECU 300 determines whether or not motor generator 130 is currently in the low output state.

If motor generator 130 is in the low output state (YES in S150A), the process proceeds to S152 where ECU 300 maintains the state of motor generator 130 and continues the inertial running (S160). The process then returns to the main routine, and the process is performed again from S100 in the next control cycle.

When vehicle speed SPD decreases to lower limit value LL of the acceptable speed range while the inertial running is continued (SPD≤LL) (YES in S135A), the process proceeds to S145 where ECU 300 switches motor generator 130 to the high output state and performs acceleration running (S160). Vehicle speed SPD is thus increased.

While the vehicle speed is increasing within the acceptable speed range by this acceleration running, NO is selected in S140 and S145 and the process proceeds to S150A. Since the acceleration running is currently being performed, namely, since motor generator 130 is in the high output state, NO is selected in S150A and the process proceeds to S154A. Then, ECU 300 varies the driving power in accordance with the driving power pattern which was set in S121, and continues the acceleration running until vehicle speed SPD reaches upper limit value UL of the acceptable speed range (S160).

Then, when vehicle speed SPD increases to upper limit value UL of the acceptable speed range (YES in S130A), the process proceeds to S140 where ECU 300 switches motor generator 130 to the low output state and performs inertial running (S160).

By performing the control in accordance with the process as described above, the driving power can be set in consideration of the driving condition and the like during acceleration running, thereby improving the drivability.

Figure 7:
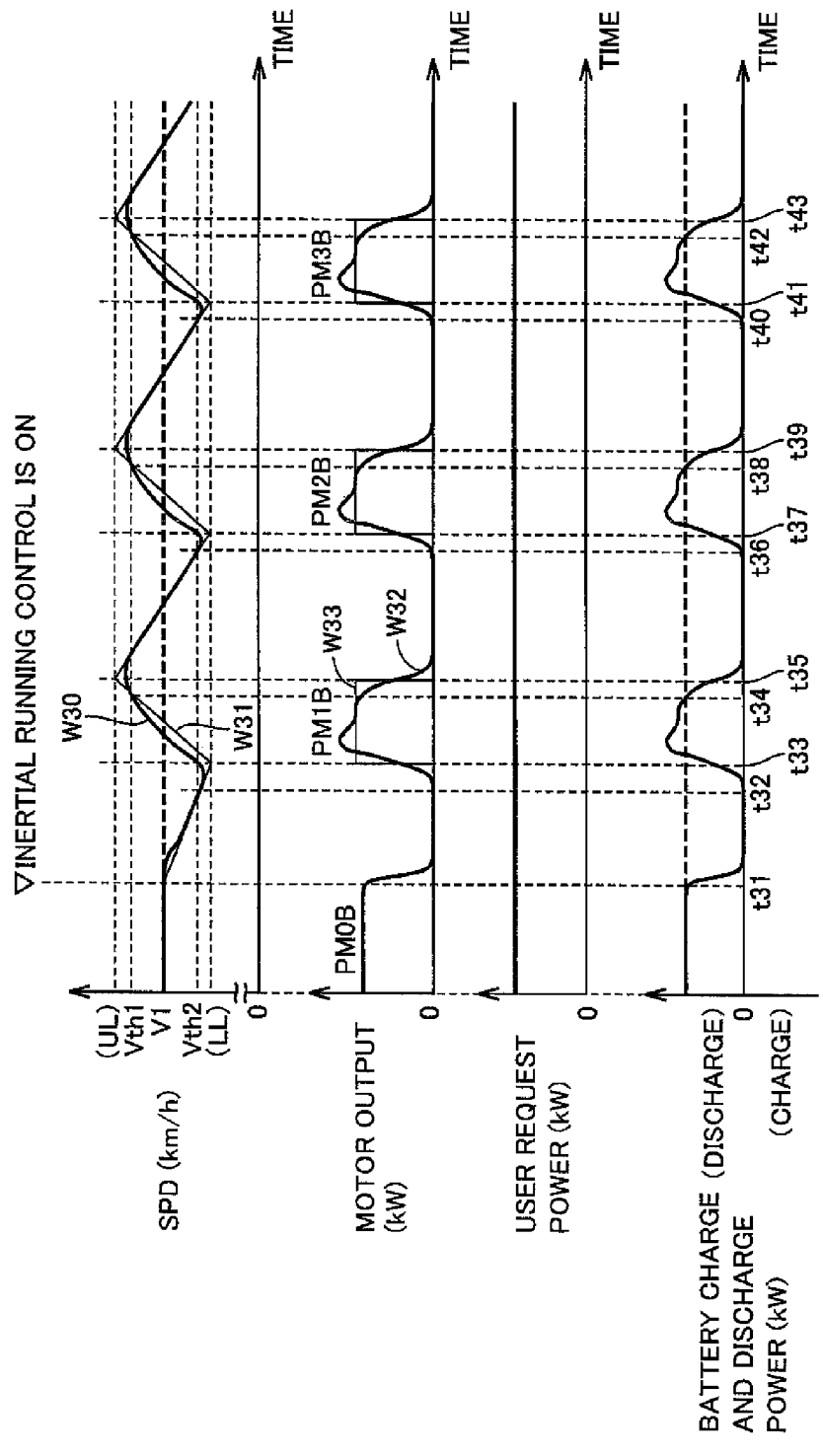
FIG. 7 is a time chart illustrating the outline of inertial running control in a variation of the second embodiment.

As shown in FIG. 7, the first embodiment and second embodiment described above may be combined together. Such a combination allows for gradual variation in vehicle speed at the time of switching between inertial running and acceleration running and also allows for appropriate change in driving power during acceleration running, thereby further improving the drivability.

Third Embodiment

In the first and second embodiments, the inertial running control in which a single motor generator is provided as a driving source was described.

In a third embodiment, an example of application of the inertial running control to a hybrid vehicle incorporating an engine in addition to a motor generator will be described.

Figure 8:
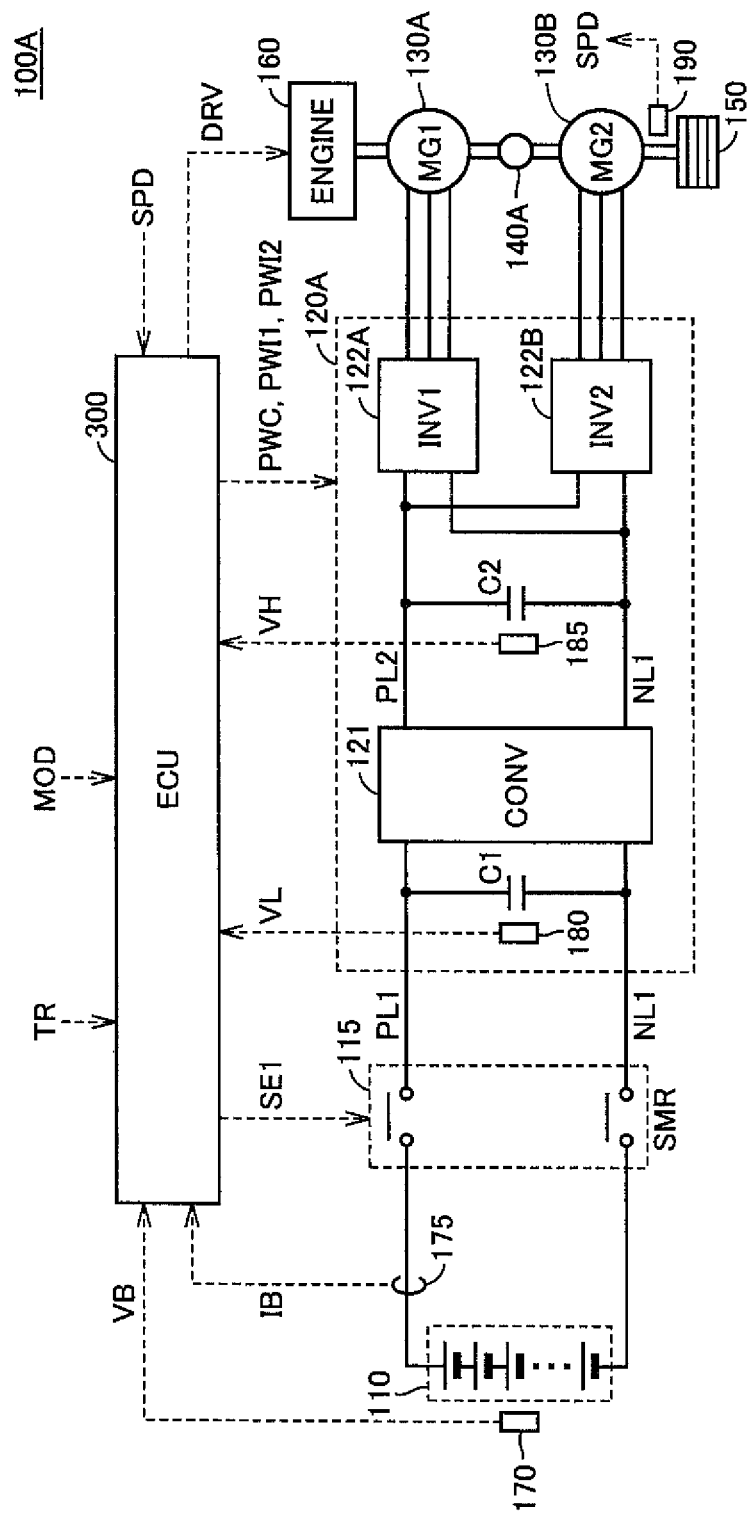
FIG. 8 is an overall block diagram of a hybrid vehicle according to a third embodiment.

FIG. 8 is an overall block diagram of a hybrid vehicle 100A according to the third embodiment. In FIG. 8, PCU 120 in FIG. 1 is replaced by a PCU 120A, and motor generator 130 is replaced by motor generators 130A, 130B and engine 160 as driving sources. The descriptions of the elements in FIG. 8 the same as those in FIG. 1 will not be repeated.

Referring to FIG. 8, PCU 120A includes converter 121, inverters 122A, 122B, capacitors C1, C2, and voltage sensors 180, 185.

Inverters 122A and 122B are connected in parallel to converter 121 through power lines PL2 and NL1.

Inverter 122A is controlled by a control signal PWI1 from ECU 300, and converts DC power from converter 121 to AC power, to drive motor generator 130A (hereinafter also referred to as an "MG1"). Inverter 122A also converts AC power generated by motor generator 130A to DC power, to charge power storage device 110 through converter 121.

Inverter 122B is controlled by a control signal PWI2 from ECU 300, and converts DC power from converter 121 to AC power, to drive motor generator 130B (hereinafter also referred to as an "MG2"). Inverter 122B also converts AC power generated by motor generator 130B to DC power, to charge power storage device 110 through converter 121.

Motor generators 130A and 130B have output shafts coupled to a power transmission gear 140A including a power split device such as a planetary gear. Driving power from motor generators 130A and 130B is transmitted to drive wheel 150.

Motor generators 130A and 130B are coupled to engine 160 through power transmission gear 140A. Engine 160 is controlled by a control signal DRV from ECU 300. Driving power generated by engine 160 is transmitted to drive wheel 150 and motor generator 130A through power transmission gear 140A. ECU 300 cooperatively controls driving power generated by motor generators 130A, 130B and engine 160, to run the vehicle.

In the third embodiment, motor generator 130A is used exclusively as a starter motor when starting engine 160 and as a generator for generating electric power by being driven by engine 160. Motor generator 130B is used exclusively as a motor for driving drive wheel 150 by using the electric power from power storage device 110.

Although FIG. 8 shows an exemplary configuration where two motor generators and one engine are provided, the number of motor generators is not limited as such. For example, one motor generator may be provided. Alternatively, more than two motor generators may be provided.

Figure 9:
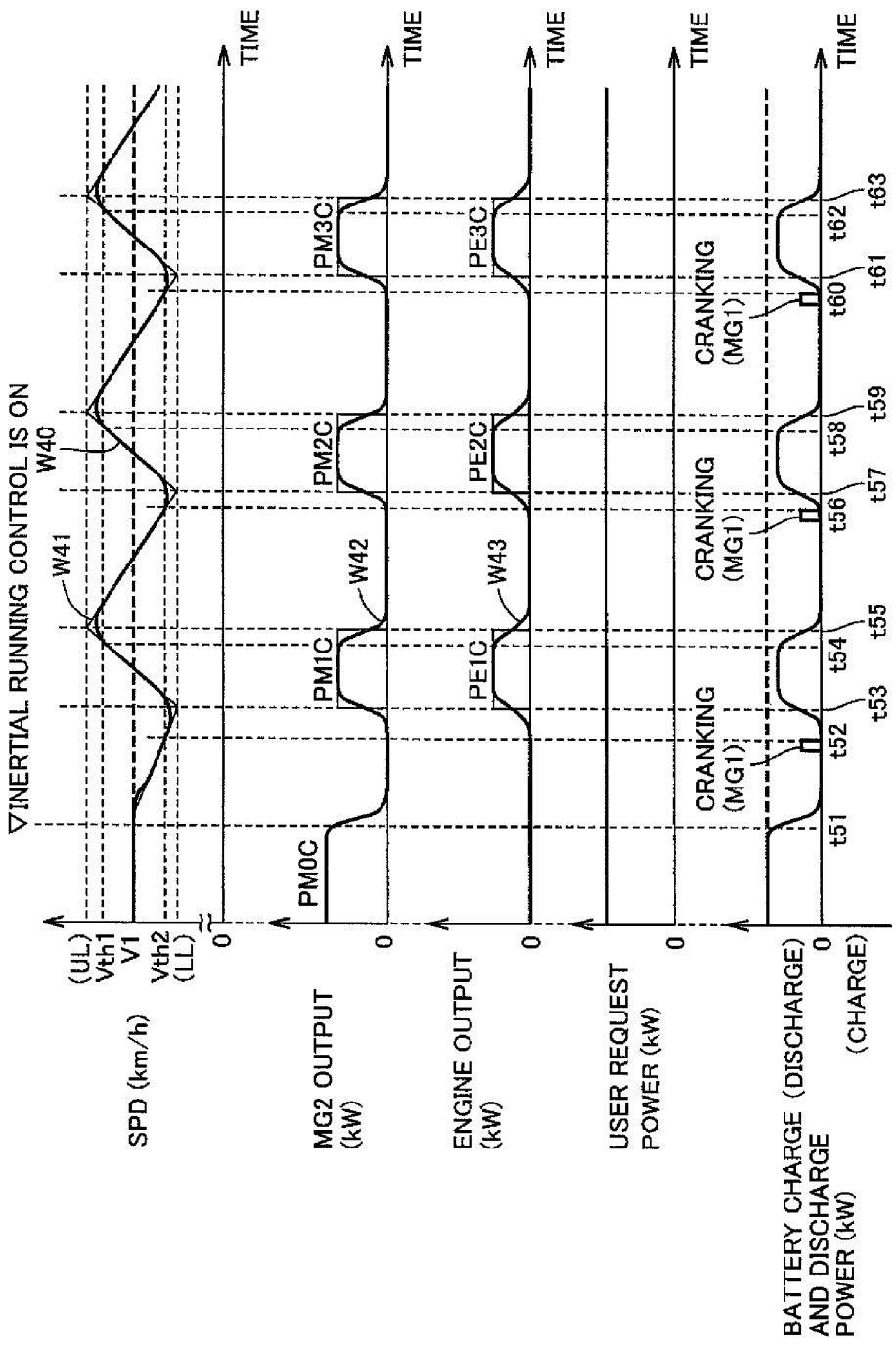
FIG. 9 is a time chart illustrating the outline of inertial running control in the third embodiment.

FIG. 9 is a time chart illustrating the outline of inertial running control in the third embodiment. In FIG. 9, a vertical axis represents vehicle speed SPD, the output of the motor generator (MG2), the request power from the user, charge and discharge power of the power storage device (battery), as well as the output of the engine.

Referring to FIG. 9, when the inertial running control is selected, the driving power required for acceleration running is output as a sum of the driving power from motor generator 130B (MG2) and the driving power from engine 160.

Between times t53 and t55 during which acceleration running is performed, for example, motor generator 130B outputs driving power PM1C and engine 160 outputs driving power PE1C. A sum of PM1C and PE1C is set to be larger than driving power PM0C capable of maintaining the vehicle speed when the inertial running control is not performed.

A ratio of the driving power allocated to motor generator 130B and engine 160 is set appropriately in consideration of their energy efficiency, response or the like.

Then, when vehicle speed SPD decreases to threshold value Vth2, the driving power of motor generator 130B and engine 160 is gradually increased over time from the low output state to the high output state. When vehicle speed SPD increases to threshold value Vth1, the driving power of motor generator 130B and engine 160 is gradually reduced over time from the high output state to the low output state.

By gradually varying the driving power of the motor generator and the engine in the shape of a non-rectangular wave at the time of switching between inertial running and acceleration running in the hybrid vehicle as well in this manner, gradual variation in vehicle speed can be provided.

In FIG. 9, engine 160 is stopped during inertial running, and engine 160 is cranked and started by motor generator 130A (MG1) immediately before the start of each acceleration running. Alternatively, the operation of engine 160 may be continued in an idle state during inertial running. Whether to stop engine 160 or perform idle operation of engine 160 during inertial running is determined by a comparison between energy required to continue the idle operation and energy required to start engine 160.

Furthermore, when the SOC of power storage device 110 decreases in hybrid vehicle 100A as shown in FIG. 8, motor generator 130A may be driven by engine 160 to perform operation of electric power generation, to charge power storage device 110 with the thus generated electric power.

Fourth Embodiment

In the third embodiment above, the hybrid vehicle including the engine and the motor generator as a plurality of driving sources was described by way of example. The present invention is also applicable to vehicles having other configurations, such as an electric vehicle having a twin motor configuration capable of running with driving power from two motor generators as a plurality of driving sources, as shown in FIG. 10, for example.

Figure 10:
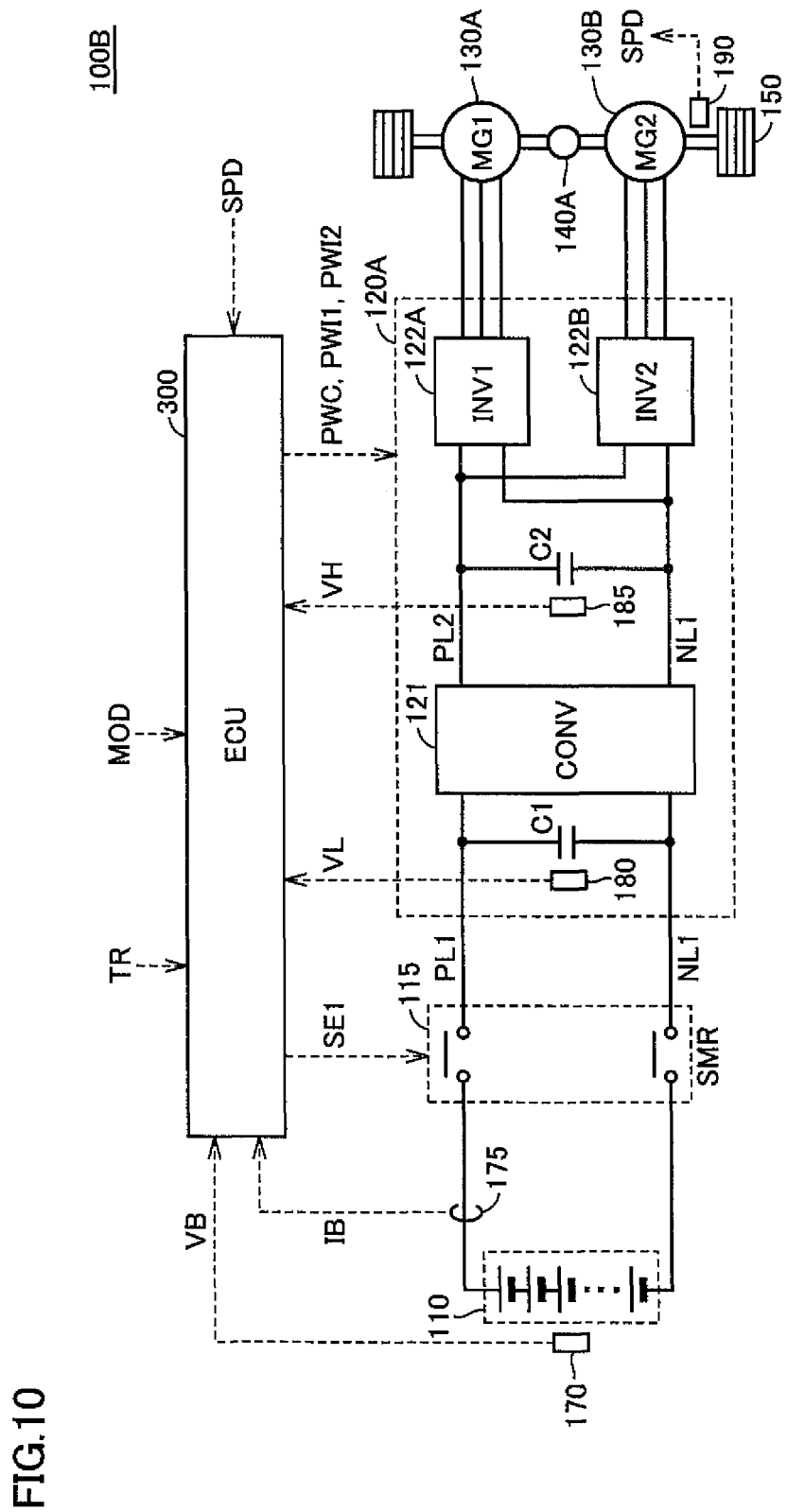
FIG. 10 is an overall block diagram of a vehicle according to a fourth embodiment where two motor generators are used as driving sources.

A vehicle 100B in FIG. 10 has the configuration of vehicle 100A in FIG. 8 which is not provided with engine 160. Vehicle 100B runs with driving power from both motor generator 130A (MG1) and motor generator 130B (MG2).

In this case, although power storage device 110 cannot be charged with motor generator 130A (MG1) as in the third embodiment, the driving power variation operation can be performed by replacing the driving power of engine 160 with an output of MG1 in FIG. 9 of the third embodiment.

The present invention is also applicable to an example where MG1 is used as a motor rather than as a generator and the vehicle runs with driving power generated by three driving sources of MG1, MG2 and engine 160, in the configuration of FIG. 8 in the third embodiment.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 100, 100A, 100B vehicle; 110 power storage device; 115 SMR; 120 PCU; 121 converter; 122, 122A, 122B inverter; 130, 130A, 130B motor generator; 140, 140A power transmission gear; 150 drive wheel; 160 engine; 170, 180, 185 voltage sensor; 175 current sensor; 190 speed sensor; 300 ECU; C1, C2 capacitor; PL1, PL2, NL1 power line.

The invention claimed is:

1. A vehicle comprising:
a rotating electric machine configured to generate power for running the vehicle; and
a processor configured to in response to receiving a constant power request: alternately switch the rotating electric machine between a first state and a second state, wherein the processor is further configured to control the rotating electric machine to:
generate power in the second state that is smaller than the power generated by the rotating electric machine in the first state, and
during a transition period between the two states, gradually increase or reduce the power generated by the rotating electric machine such that a magnitude of a rate of a temporal variation in the power generated by the rotating electric machine corresponds to a non-rectangular shape so as to prevent a great torque shock, thereby improving drivability, the gradual increase/reduction of the generated power being either a continuous increase/reduction of power or a plurality of steps of increase/reduction of power.

2. The vehicle according to claim 1, wherein the processor is further configured to vary generated by the rotating electric machine in the first state over time.

3. The vehicle according to claim 1, wherein the processor is further configured to determine that a user's power request is a constant power request, when power requested by a user varies within a prescribed range.

4. The vehicle according to claim 1, wherein the processor is further configured to perform the alternate switching between the first and second states so as to maintain a speed of the vehicle within an acceptable range.

5. The vehicle according to claim 4, wherein the processor is further configured to:
start a transition to the first state in response to a decrease in the speed of the vehicle to a first threshold value, which is determined from a lower limit value of the acceptable range, and
start a transition to the second state in response to an increase in the speed of the vehicle to a second threshold value determined from an upper limit value of the acceptable range.

6. The vehicle according to claim 1, wherein
the power generated in the first state is set to be larger than a reference power of constant output capable of maintaining a speed of the vehicle, and
the power generated in the second state is set to be smaller than the reference power.

7. The vehicle according to claim 6, wherein the processor is further configured to stop the generation of power from the rotating electric machine in the second state.

8. The vehicle according to claim 6, wherein the vehicle runs mainly with inertial force of the vehicle in the second state.

9. The vehicle according to claim 1, further comprising another driving source generating driving power for running the vehicle.

10. The vehicle according to claim 9, wherein the processor is further configured to:
set a sum of the power generated by the rotating electric machine and the other driving source in the first state to be larger than a reference power of constant output capable of maintaining a speed of the vehicle, and
set a sum of the power generated by the rotating electric machine and the other driving source in the second state to be smaller than the reference power.

11. The vehicle according to claim 10, wherein the processor is further configured to control the other driving source to alternately switch the other driving source between a third state and a fourth state, the other driving source generating power in the third state, the other driving source generating power smaller than the power generated in the third state in the fourth state.

12. The vehicle according to claim 9, wherein the other driving source is an internal combustion engine.

13. The vehicle according to claim 9, wherein the other driving source is another rotating electric machine different from the rotating electric machine.

14. A method of controlling a vehicle including a rotating electric machine generating power for running the vehicle, the method comprising the steps of:
setting a first state of generating driving power for the rotating electric machine;
setting a second state of generating power for the rotating electric machine, the power generated in the second state being smaller than the power generated in the first state; and
in response to receiving a constant power request, alternately switching between the first state and the second state, wherein, during a transition period between the two states, the processor is further configured to cause gradual increase or reduction of the power generated by the rotating electric machine such that a magnitude of a rate of a temporal variation in the power generated by the rotating electric machine corresponds to a non-rectangular shape so as to prevent a great torque shock, thereby improving drivability, the gradual increase/reduction of the generated power being either a continuous increase/reduction of power or a series of steps of increase/reduction of power.

* * * * *